United States Patent [19]
Webb

[11] Patent Number: 4,782,704
[45] Date of Patent: Nov. 8, 1988

[54] MERCURY MANOMETER

[75] Inventor: John Webb, Clearwater, Fla.
[73] Assignee: G. S. Phillips, Lakeland, Fla.
[21] Appl. No.: 942,238
[22] Filed: Dec. 16, 1986
[51] Int. Cl.$^4$ .......................... G01L 7/18; G01L 9/00
[52] U.S. Cl. ...................................................... 73/749
[58] Field of Search ................. 73/749, 750, 748, 747, 73/298, 301

[56] References Cited

U.S. PATENT DOCUMENTS

| | | | |
|---|---|---|---|
| 785,438 | 3/1905 | Sargent | 73/749 |
| 3,303,703 | 2/1967 | Wilson | 73/747 |
| 3,376,732 | 4/1968 | Koester | 73/747 |

FOREIGN PATENT DOCUMENTS

| | | | |
|---|---|---|---|
| 0028383 | 2/1925 | France | 73/749 |
| 1182973 | 9/1957 | France | 73/747 |

*Primary Examiner*—Donald O. Woodiel
*Attorney, Agent, or Firm*—Dominik, Stein, Saccocio, Reese, Colitz & Van Der Wall

[57] ABSTRACT

This invention relates to mercury manometers for a purge bubbler liquid level control system or the like. More particularly, this invention relates to mercury manometers comprising a mercury column with electrical contacts imbedded in the walls of the column for sensing specific liquid levels.

6 Claims, 1 Drawing Sheet

U.S. Patent Nov. 8, 1988 4,782,704
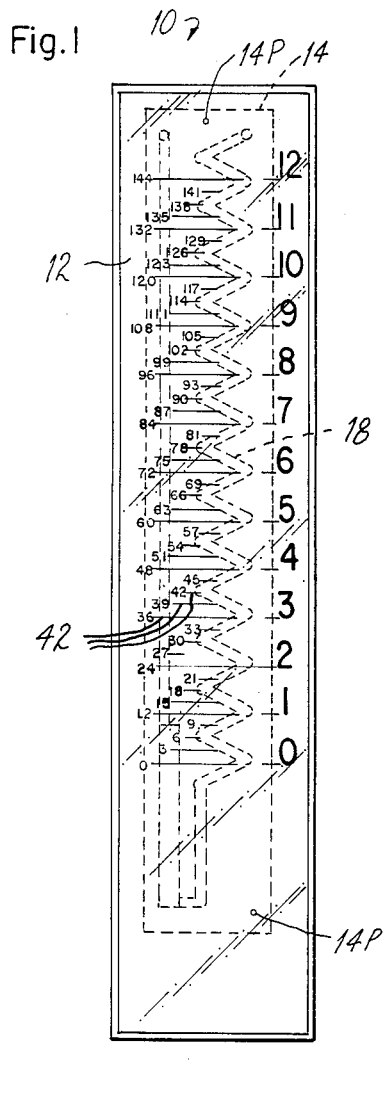
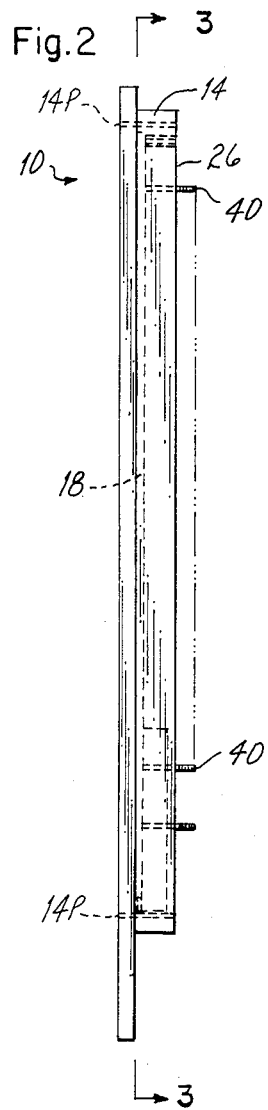
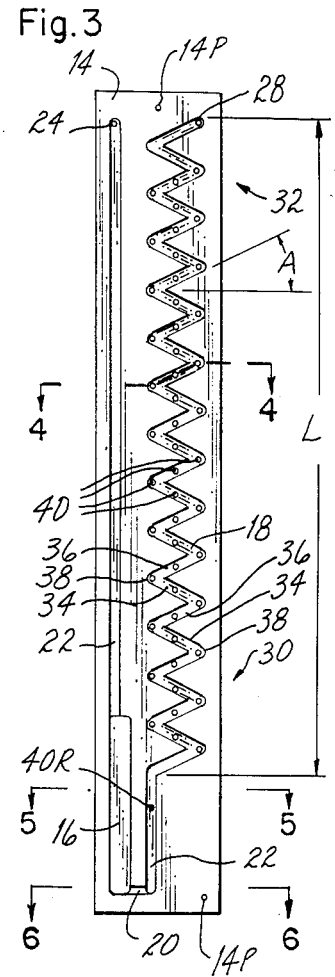
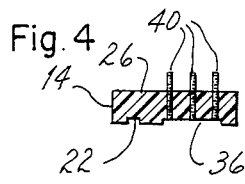
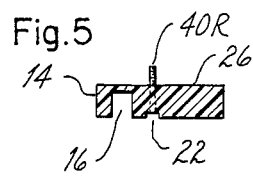
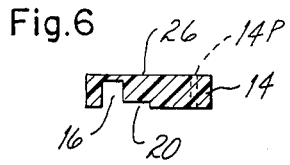

MERCURY MANOMETER

BACKGROUND OF THE INVENTION

1. Field of the Invention

This invention relates to mercury manometers for a purge bubbler liquid level control system or the like. More particularly, this invention relates to mercury manometers comprising a mercury column with electrical contacts imbedded in the walls of the column for sensing specific liquid levels.

2. Description of the Background Art

Presently, there exist many types of instruments designed to maintain a predetermined level in a tank. One such type of instrument comprises a purge bubbler system in which compressed air is forced through a bubbler line to the liquid containing tank to bubble out of the line through the liquid contained in the tank. The resultant hydrostatic back pressure in the line is then sensed with a mercury manometer to control the fluid pumps or the like fluidly connected to the tank, thereby controlling the level of the liquid in the tank. Such purge bubbler systems are particularly suitable for use in the sanitation fields, such as sewage lift stations, because the flow of compressed air through the bubbler line constantly purges the line of contaminants while balancing the liquid head pressure in the tank.

Mercury manometers which are used in conjunction with purge bubbler systems as described above, typically comprise a mercury column having electrical contacts imbedded in the wall of the column for connection to the electrical controller of the purge bubbler system. A mercury reservoir is connected to the input of the mercury column for storage of a quantity of mercury at atmospheric or other calibrated pressure representative of zero (0) relative pressure. U.S. Pat. No. 3,947,692 discloses one such mercury manometer, the disclosure of which is hereby incorporated by reference herein.

An improved mercury manometer is disclosed in U.S. Pat. No. 4,297,081, the disclosure of which is also incorporated by reference herein. The mercury manometer disclosed in Patent '081 comprises a mercury manometer having a base plate composed of a transparent material and having the input and overflow reservoirs and the mercury column machined into the surface of the base plate. An O-ring is positioned within an O-ring groove about the periphery of the reservoirs and the mercury column. A transparent face plate is then bolted to the face of the base plate to produce the fluid-tight reservoirs and mercury column by the sealing action of the 0-ring between the base plate and face plate. As disclosed, the base plate is machined to produce a mercury reservoir of sufficient volume to match the mercury column volume. Thus, the resolution of the rise of the mercury within the mercury column is a function of the cross-sectional area of the mercury column, with smaller cross-sectional area defining a longer length mercury column thereby providing greater resolution between electrical contacts. Conversely, larger cross-sectional area of the mercury column defines a shorter length mercury column with lower resolution due to the physical size of the electrical contacts used to make contact with the mercury column and the ability of the technician to visually determine small changes in movement of the mercury in the column. Indeed, as disclosed in U.S. Pat. No. '081, the resolution of the mercury manometer is limited to the diameter of the electrical contact screws. Thus, greater resolution can only be obtained by using smaller diameter contact screws or the like or staggering the contact screws across a wider mercury column. It is noted, however, that the greater width mercury column also decreases the visual resolution of the manometer when visually viewed by the technician via the transparent face plate.

Therefore, it is an object of this invention to provide an apparatus which overcomes the aforementioned inadequacies of the prior art devices and provides an improvement which is a significant contribution to the advancement of the mercury manometer art.

Another object of this invention is to provide a mercury manometer having greater electrical resolution than prior art mercury manometers of a given overall size.

Another object of this invention is to provide a mercury manometer having increased visual resolution over prior art mercury manometers of a given overall size.

Another object of this invention is to provide a mercury manometer having a mercury column of small cross-sectional area and being positioned in an accordion shape having a reduced overall length but providing great resolution over that which is attainable by a non-accordion shaped mercury column.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a mercury manometer having an accordion shaped mercury column connected in fluid communication with a mercury reservoir for visually and electrically measuring the difference between an input pressure and an output pressure. More particularly, the mercury manometer of the invention is particularly adaptable to be used in conjunction with a purge bubbler system in which air pressure is applied to the input of the mercury reservoir of the manometer representative of the head pressure in the tank being monitored and the output of the mercury column being vented to the atmosphere at atmospheric pressure such that the difference in pressure between the input and output of the manometer is representative of the liquid level in the tank of the purge bubbler system.

The accordion shape of the mercury column of the manometer of the invention provides a manometer with greater resolution when compared to the overall length of the mercury column. Specifically, the accordion shape of the mercury column includes an effective length which is significantly greater than the overall length of the column due to the compressed accordion shaped configuration. Hence, the cross sectional area of the mercury column may be comparably small such that small pressure differentials result in movement of the mercury a significant distance within the column. Visual resolution of the manometer is therefore greatly increased. Additionally, the decreased cross-sectional area of the mercury column combined with the accordion configuration of the column, allows a multitude of electrical contact screws to be connected in electrical contact with the column along the full length thereof. Hence, the need, typical in the prior art manometers, for specially configured contact screws having small head diameters and/or greater cross-sectional area mercury columns is eliminated.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a frontal plan view of the mercury manometer of the invention illustrating the indicia markings printed on the transparent face plate of the manometer in relative comparison to the level of the mercury in the mercury column thereof;

FIG. 2 is a right side view of FIG. 1, illustrating the transparent face plate adhesively affixed to the base plate of the manometer of the invention;

FIG. 3 is a cross-sectional view of FIG. 2, along lines 3—3, illustrating the front surface of the base plate of the manometer and the mercury reservoir and mercury column machined therein;

FIG. 4 is a cross-sectional view of FIG. 3, along lines 4—4, illustrating the cross-sectional configuration of the mercury column formed in the base plate;

FIG. 5 is a cross-sectional view of FIG. 3, along lines 5—5, illustrating the cross-sectional configuration of the mercury reservoir; and FIG. 6 is a cross-sectional view of FIG. 3, along lines 6-6, illustrating the channel interconnecting the mercury reservoir with the mercury column allowing the mercury to flow from the reservoir to the column as pressure is applied to the input of the reservoir.

Similar reference characters refer to similar parts throughout the several views of the drawings.

DETAILED DESCRIPTION OF THE PREFERRED EMBODIMENT

Referring to FIGS. 1, 2 and 3, the mercury manometer 10 of the invention comprises a face plate 12 adhesively and accurately mounted to a base plate 14 via alignment pins 14P. A mercury reservoir 16 and a mercury column 18 are formed within the base plate 14.

The reservoir 16 is fluidly connected to the column 18 by means of an interconnecting channel 20. An input channel 22 is likewise formed within the base plate 14 and connected in fluid communication with the reservoir 16. An input hole 24 is formed through the base plate 14 from the rear side 26 thereof to be in fluid communication with the input channel 22. Likewise, an output hole 28 is formed through the base plate 14 from the rear side 26 thereof to be in fluid communication with the output of the mercury column 18. Both the input hole 24 and output hole 28 allow the connection of input and output tubing or other conduit to the input channel 22 and the output of the mercury column 18, respectively, through the use of tube fittings (not shown) or the like.

More particularly, referring specifically to FIG. 3, the mercury column 18 comprises an accordion shaped configuration extending from the lower portion, generally indicated by numeral 30, and the upper portion, generally indicated by numeral 32, of the base plate 14. Such accordion shaped configuration of the mercury column 18 preferably comprises a plurality of leftward, upwardly sloped column segments 34, serially and alternatively, fluidly connected with rightward, upwardly sloped column segments 26 at apex points 38, thereby defining an alternating left and right disposed mercury column 18 having an accordion shaped configuration. Hence, it should be appreciated that the effective length of the mercury column 18 is significantly greater than the overall length designated by dimension "L", of the column 18. Indeed, it can be mathematically shown that the effective length of the mercury column is equal to the cosecant of the angle of inclination "a" relative to th horizontal multiplied by the overall length "L" of the column 18. For example, assuming that the angle of inclination "a" is equal to 26 degrees (as shown), the effective length of the column is the cosecant of 26 degrees (equal 2.28) times the overall length "L". Thus, it is readily seen that the accordion shaped configuration of the column 18 has an effective length which is 2.28 times greater than the overall length "L" of the column 18.

A shown in FIGS. 3 and 4, an electrical contact screw 40 is sealingly threadably engaged through the base plate 14. Preferably, contact screws 40 are positioned at each apex point 38 and midway within each column segment 34 and 36. A reference contact screw 40R is similarly threaded through the base plate 14 and positioned within the interconnecting channel 20. Thus, it should be apparent that electrical continuity between the reference contact screw 40R and the other contact screws 40 positioned within the mercury column 18 is sequentially made as the mercury flows upwardly through column 18 as pressure is applied via input channel 22 to the mercury contained within reservoir 16.

Returning to FIG. 1, face plate 12 is manufactured from a transparent or translucent material such as an acrylic which allows the flow of the mercury through the mercury column 18 to be visually observed by a technician. Staggered indicia 42 are printed on the face plate 12 to indicate to the technician the amount of pressure applied to the manometer 10 via input 24 relative to the atmospheric or other pressure present at output hole 28. Indeed, the mercury reservoir 16 is configured and dimensioned to include a volume equal or greater than the volume of the mercury column 18 such that when the reservoir 16 is filled with mercury, such mercury may flow into the mercury column 18 as pressure is applied to the reservoir 16 via input channel 22 and input hole 24. In this regard, FIGS. 5 and 6 illustrate the preferred cross-sectional configuration of the reservoir 16 and the cross-sectional configuration of the channel 20 which interconnects the reservoir 16 to the mercury column 18.

Experience has shown that, during actual use, a certain degree of mixing of the mercury occurs as the mercury flows upwardly through the mercury column 18 due to the accordion shaped configuration thereof. Such continual mixing of the mercury during use allows air bubbles that otherwise may become entrapped in the mercury to float to the surface of the mercury and be released via output hole 28, thereby assuring that the total volume of the mercury will not be inaccurately altered as may otherwise occur if air bubbles existed in the mercury.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described, what is claimed is:

1. A manometer containing an electrically conductive fluid, comprising in combination:
    a base plate including a fluid reservoir fluidly connected to a fluid column with an input connected to said reservoir and an output connected to an output of said column;
    a plurality of electrical contacts connected in electrical contact with said column;
    said column being alternatively vertically leftward and rightward configured to increase the effective length of said column relative to the overall length of said column to increase the resolution of the manometer, said alternating vertical leftward and rightward configuration of said column comprising alternating leftward column segments serially connected with rightward column segments at apex points to define an accordion shaped configuration; and
    one of said electrical contacts is positioned at each of a plurality of said apex points.

2. The manometer as set forth in claim 1, wherein one of said electrical contacts is positioned midway within each of a plurality of said column segments.

3. The manometer as set forth in claim 1, wherein said fluid reservoir and said fluid column are machined into a face of said base plate and wherein said manometer further comprises a face plate and means for sealingly mounting said face plate to said face of said base plate to define said fluid reservoir and said fluid column.

4. The manometer as set forth in claim 3, wherein said means for sealingly mounting said face plate to said face of said base plate comprises an adhesive.

5. The manometer as set forth in claim 4, wherein said face plate is translucent.

6. The manometer as set forth in claim 5, wherein indicia are affixed to said face plate and positioned relative to said fluid column to visually indicate the flow of said fluid therein via the translucency of said face plate.

* * * * *